Figure 1:
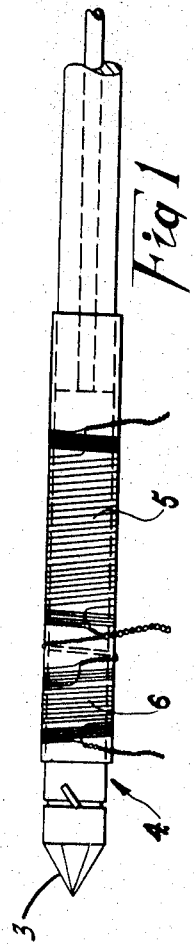

United States Patent [19]

Schick et al.

[11] 3,716,692
[45] Feb. 13, 1973

[54] TEMPERATURE CONTROLLED SOLDERING IRONS

[76] Inventors: Rudolf Schick, 181 High Street; Robin William Mackie, 15 Livingstone Street; Alan Lindsay Royston, 1 Mountfield Road, all of Victoria, Australia

[22] Filed: Feb. 19, 1971

[21] Appl. No.: 117,014

[30] Foreign Application Priority Data

July 16, 1970 Australia............................17701/70

[52] U.S. Cl. ..................219/241, 219/236, 219/501, 219/505, 228/51
[51] Int. Cl. ............................H05b 1/02, B23k 3/04
[58] Field of Search......219/241, 501, 504, 505, 240, 219/229, 236–239; 228/51–55

[56] References Cited

UNITED STATES PATENTS

| | | | |
|---|---|---|---|
| 915,974 | 3/1909 | Leonard | 219/241 X |
| 3,551,639 | 12/1970 | Gotley | 219/241 |
| 3,393,856 | 7/1968 | Fortune | 219/241 UX |
| 3,456,095 | 7/1969 | Fox | 219/241 UX |
| 3,571,564 | 3/1971 | Welch | 219/501 |

FOREIGN PATENTS OR APPLICATIONS

| | | | |
|---|---|---|---|
| 930,351 | 8/1947 | France | 219/241 |
| 1,068,419 | 5/1967 | Great Britain | 219/241 |
| 588,216 | 5/1947 | Great Britain | 219/241 |

*Primary Examiner*—A. Bartis
*Attorney*—Stevens, Davis, Miller & Mosher

[57] ABSTRACT

A temperature controlled electrical soldering iron includes a soldering tip removably secured in a nickel or nickel alloy barrel. An electric heating coil is wound around the barrel and heating current is supplied thereto through a solid state SCR temperature control circuit. The control circuit includes a nickel wire temperature sensing element wound about the barrel in axially displaced, non-overlapping relationship to the heating coil with the sensing element being in closer proximity to the soldering face of the soldering tip than the heating coil. The variation in resistance of the sensing element as the soldering tip temperature changes causes the SCR to be turned on and off through a triggering circuit including a transistor and a silicon controlled switch.

5 Claims, 3 Drawing Figures

PATENTED FEB 13 1973 3,716,692

SHEET 1 OF 2

TEMPERATURE CONTROLLED SOLDERING IRONS

The present invention relates to soldering irons and particularly to soldering irons for soldering connections in electronic circuits.

As electronic circuits become more refined and components miniaturized and mounted close together on relatively delicate printed circuit boards, the need for closer control of the temperature of the soldering tips of soldering irons has become critical.

At the higher soldering temperatures components, circuit boards and insulation are susceptible to damage, even destruction, and the quality of the soldered connections is likely to be affected. In addition excessive oxidation or drossing of the soldering face may occur and may lead to contaminated soldered terminations and cause the effective service life of the soldering tip to be considerably shortened.

At the lower soldering temperatures insufficient fluxing and wetting of the component parts of the termination may occur causing "dry" or electrically inefficient soldered joints and, paradoxically, thermal damage to components, due to the need to extend the dwell or contact time of the soldering tip.

If the mass and therefore the thermal capacity of the soldering tip could be increased or even maintained it would be possible to maintain its temperature within the relatively small temperature range necessary to perform a reasonable sequence of soldering operations, but close mounting of small components on narrow wiring paths in modern electronic circuits requires reduction in soldering tip diameters and profiles to the point at which the thermal capacity of the soldering tip is greatly reduced.

The control of the temperature of the soldering tip by increasing the power loading in the electrical heating element beyond the tolerable level of a conventional soldering iron and switching off the current when the desired temperature is reached has been found effective since it substitutes immediate high powered reheating of the soldering tip for the reservoir of heat available from unuseable large soldering tools. Hitherto such control has been effected by electromechanical means which are relatively large, cumbersome and prone to friction, arcing and magnetic influences. Furthermore the sensing of the temperature of the soldering tip at a point remote from the soldering face reduces the sensitivity of such devices.

The primary object of the present invention is to provide a temperature controlled soldering iron of a size suitable for soldering tiny delicate electronic and microelectronic devices located in close proximity to each other on fine wiring tracks or to perform internal soldered connections within microelectronic packages.

According to the invention a soldering iron comprises a soldering tip heatable to a predetermined operating temperature to perform a soldering operation, an electrical heater element for heating the soldering tip, an electrically conductive sensing element having an electrical resistance which varies with temperature and associated wit the soldering tip so that its temperature and resistance will vary as the temperature of the soldering tip rises and falls, an electrical circuit for supplying electric current to the heater element, and a control circuit electrically connected to the sensing element so as to detect a variation of resistance therein and to the electrical circuit to open and close the electrical circuit, whereby, when the soldering tip heats to the predetermined operating temperature, the resultant variation in resistance of the sensing element will cause the control circuit to open the electrical circuit to cut off the flow of current to the heater element and when the soldering tip cools below the predetermined operating temperature the resultant variation in resistance of the sensing element will cause the control circuit to close the electrical circuit to permit current to flow to the heater element.

In a preferred form of the invention the soldering iron comprises a soldering tip heatable to a predetermined operating temperature to perform a soldering operation, an electrical heater element for heating the soldering tip, an electrically conductive sensing element having a resistance to current flow which increases with a rise in its temperature and associated with the soldering tip so that its temperature will rise and fall and its resistance will increase and decrease as the temperature of the soldering tip rises and falls, an electrical circuit for supplying electric current to the heater element, and a control circuit electrically connected to the sensing element so as to detect a variation of resistance therein and to the electrical circuit to open and close the electrical circuit, whereby, when the soldering tip heats to the predetermined operating temperature, the resultant increase in resistance of the sensing element will cause the control circuit to open the electrical circuit to cut off the flow of current to the heater element and when the soldering tip cools below the predetermined operating temperature the resultant decrease in resistance of the sensing element will cause the control circuit to close the electrical circuit to permit current to flow to the heater element.

In order that the invention may be readily understood reference is made to the accompanying drawings in which FIG. 1 is a side elevation of part of a soldering iron incorporating the present invention.

Figure 3:
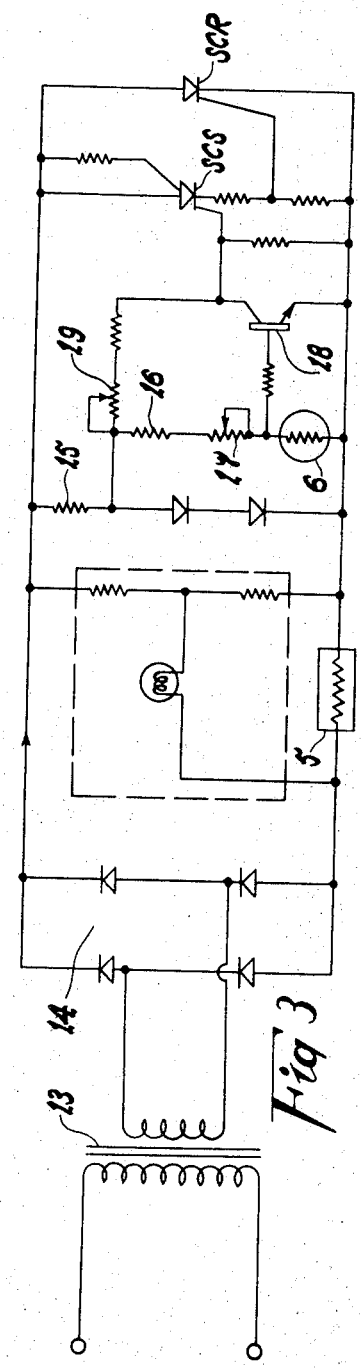
Figure 2:
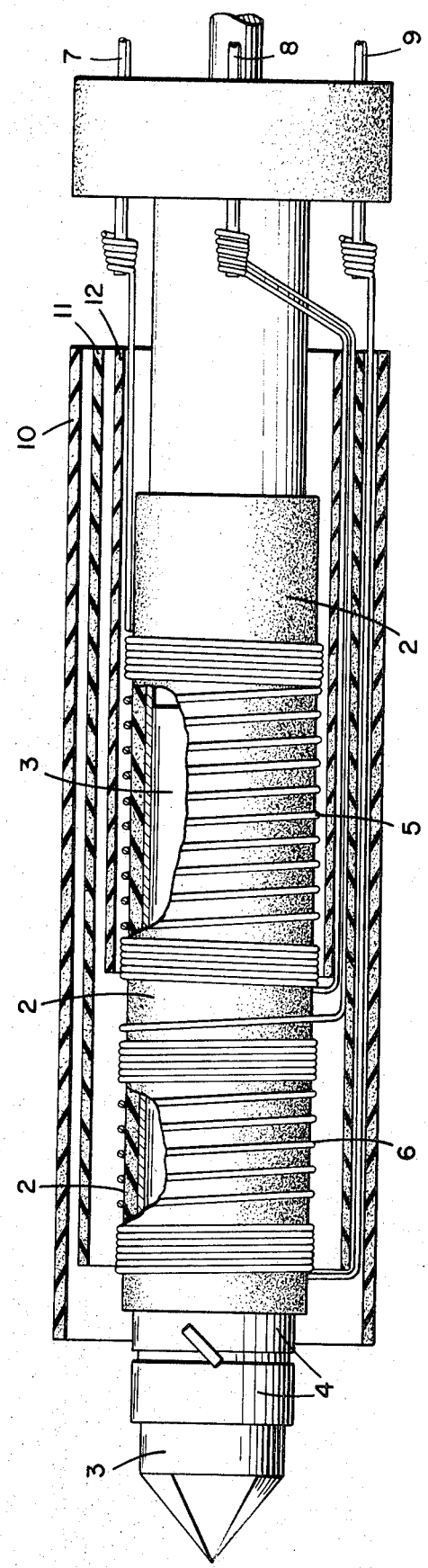

FIG. 2 is an enlarged longitudinal section of the part illustrated in FIG. 1 and FIG. 3 is the circuit diagram of a control circuit used in the soldering iron of the invention.

Referring to the drawings the soldering iron included a soldering tip 3 heatable to a predetermined operating temperature to perform a soldering operation and adapted to fit into the barrel 4 of the soldering iron.

An electrical heater element 5 is provided to heat the soldering tip 3.

The heater element 5 is wound on but electrically insulated from the barrel 4 by insulator 2. The barrel 4 is precisely machined to have a relatively thin wall and is preferably composed of a material having a high thermal conductivity such as nickel, a nickel-copper-iron alloy or similar material.

The soldering iron also includes an electrically conductive sensing element 6. The sensing element 6 has a resistance to current flow which increases with a rise in its temperature and may consist of a coil of wire composed of a metal having a resistance to current flow which increases with a rise in its temperature. As shown in FIGS. 1 and 2 the coil is wound around but is electrically insulated from the barrel 4 by insulator 2. Thus the sensing element 6 is associated with the soldering tip 3 so that its temperature will rise and fall and its resistance will increase and decrease as the temperature of the soldering tip rises and falls. The sensing element 6 is preferably composed of nickel.

An electrical circuit is provided for supplying electric current to the heater element 5.

A control circuit is electrically connected to the sensing element so as to detect a change of resistance therein and to the electrical circuit to open and close the electrical circuit so that when the soldering tip 3 heats to the predetermined operating temperature, the resultant increase in resistance of the sensing element 6 will cause the control circuit to open the electrical circuit to cut off the flow of current to the heater element 5 and when the soldering tip 3 cools below the predetermined operating temperature the resultant decrease in resistance of the sensing element 6 will cause the control circuit to close the electrical circuit to permit current to flow to the heater element 5.

Terminals 7, 8 and 9 are provided to connect the electrical circuit to the heater element 5 and to connect the sensing element to the control circuit and the electrical circuit. In order to overcome the difficulty of providing two pairs of terminals to make these connections one of the terminals 7, 8 and 9 may act as a common terminal for one end of the sensing element and one end of the heater element, these ends being twisted together as shown in FIG. 1.

As shown in FIG. 2 the leads to the terminals 7, 8 and 9 are insulated from one another by layers 10, 11 and 12 of a suitable insulating material such as mica.

The control circuit may include manually adjustable means whereby the electrical circuit is opened and closed at different predetermined operating temperatures thereby to permit the operating temperature of the soldering tip 3 to be varied for different soldering operations.

FIG. 3 is the circuit diagram of apparatus in accordance with the invention.

Current is supplied to the heater element 5 from alternating current mains via transformer 13 and bridge rectifier circuit 14. The sensing element 6 is connected to the rectifier circuit 14 via resistors 15 and 16 and potentiometer 17.

The control circuit comprises the silicon controlled rectifier SCR connected in series with the heater element 5, the silicon controlled switch SCS and the transistor 18.

In the operation of the circuit when current is switched on from the mains the resistance of the sensing element 6 will be such that the transistor 18 will be non conductive and the switch SCS will trigger the rectifier SCR to its conductive state. Consequently the heater element 5 will be heated.

As the temperature of the heater element 5 rises and the soldering tip 23 is heated the rise in temperature is quickly communicated to the sensing element and the resistance of the sensing element will increase. When the soldering tip 3 is heated to the required operating temperature the resistance of the sensing element 6 will be such that the transistor 18 will become conductive. Consequently the rectifier SCR will revert to its non conductive state to cut off the flow of current to the heater element 5. As the soldering tip 3 cools below the required operating temperature the resistance of the sensing element 6 will decrease. Consequently the transistor 18 again becomes non conductive and the rectifier SCR is again triggered to its conductive state by the switch SCR.

This sequence of operations continues with the result that the soldering tip is automatically maintained at the required operating temperature.

The temperature at which the soldering tip 3 will operate may be varied by adjusting the potentiometer 17.

The potentiometer 19 may be provided to limit the maximum temperature at which the soldering tip will operate.

Although the invention has been particularly described with reference to a sensing element having a resistance to current flow which varies in direct proportion to a change in temperature it is to be understood that a sensing element having a resistance to current flow which varies in inverse proportion to a change in temperature could be used. For example a thermister could be associated with the soldering tip so as to sense a change in temperature of the soldering tip.

In addition a programmable unijunction transistor (PUJT) can be used instead of the transistor 18 and the silicon controlled switch SCS.

HAVING NOW described our invention, what we claim as new and desire to secure by Letters Patent is:

1. An electrical soldering iron including:
    a barrel,
    a soldering tip removably secured in said barrel,
    an electrical heating coil wound about said barrel in electrically insulated relationship therewith to heat said barrel and said soldering tip when current flows through said coil,
    and an associated electrical circuit to supply a heating current to said heating coil,
    said barrel being composed of of a material selected from the group consisting of nickel and nickel alloy, said soldering tip being secured in close heat transferring relationship with said barrel, a nickel wire sensing element wound about said barrel and electrically insulated therefrom, said sensing element being axially displaced in non-overlapping relation from said heating coil, and said sensing element being in closer proximity to the soldering face of said soldering tip than said heating coil, and control circuit means electrically connected to the sensing element provided to open and close said electrical circuit in response to the variation in resistance of said sensing element, whereby when the soldering tip heats to the predetermined operating temperature, the resultant increase in resistance of the sensing element will cause the control circuit means to open the electrical circuit to cut off the flow of current to the heating coil and when the soldering tip cools below the predetermined operating temperature the resultant decrease in resistance of the sensing element will cause the control circuit means to close the electrical circuit to permit current to flow to the heating coil.

2. A soldering iron according to claim 1, wherein the control circuit means includes manually adjustable means whereby the electrical circuit may be opened and closed at different predetermined operating temperatures thereby to permit the operating temperature of the soldering tip to be varied for different soldering operations.

3. A soldering iron according to claim 1, wherein the control circuit means comprises an electronic control circuit for detecting a variation in resistance to current flow of the sensing element with a change in temperature of the soldering tip, the control circuit including a rectifier connected in circuit with the heating coil and adapted to be triggered from a conductive state to a non-conductive state and vice versa, and a triggering circuit for triggering the rectifier from one state to the other and connected to the sensing element so that the rectifier is triggered into its non-conductive state when the resistance of the temperature sensing element increases to its value of resistance at the predetermined temperature and is triggered into its conductive state when the resistance of the temperature sensing element decreases to a value of resistance less than that at the predetermined temperature.

4. A soldering iron according to claim 3, wherein the rectifier is a silicon controlled rectifier and the triggering circuit includes a transistor and a silicon controlled switch.

5. A soldering iron according to claim 3, wherein a variable resistor is connected in series with the sensing element whereby the triggering circuit can be adjusted to operate at different values of resistance of the sensing element to permit the temperature of the soldering tip to be varied for different soldering operations.

* * * * *